Jan. 21, 1958 L. V. SORG 2,820,550
GRAVITY-TYPE WASTE WATER-OIL SEPARATORS
Filed June 29, 1955 2 Sheets-Sheet 1
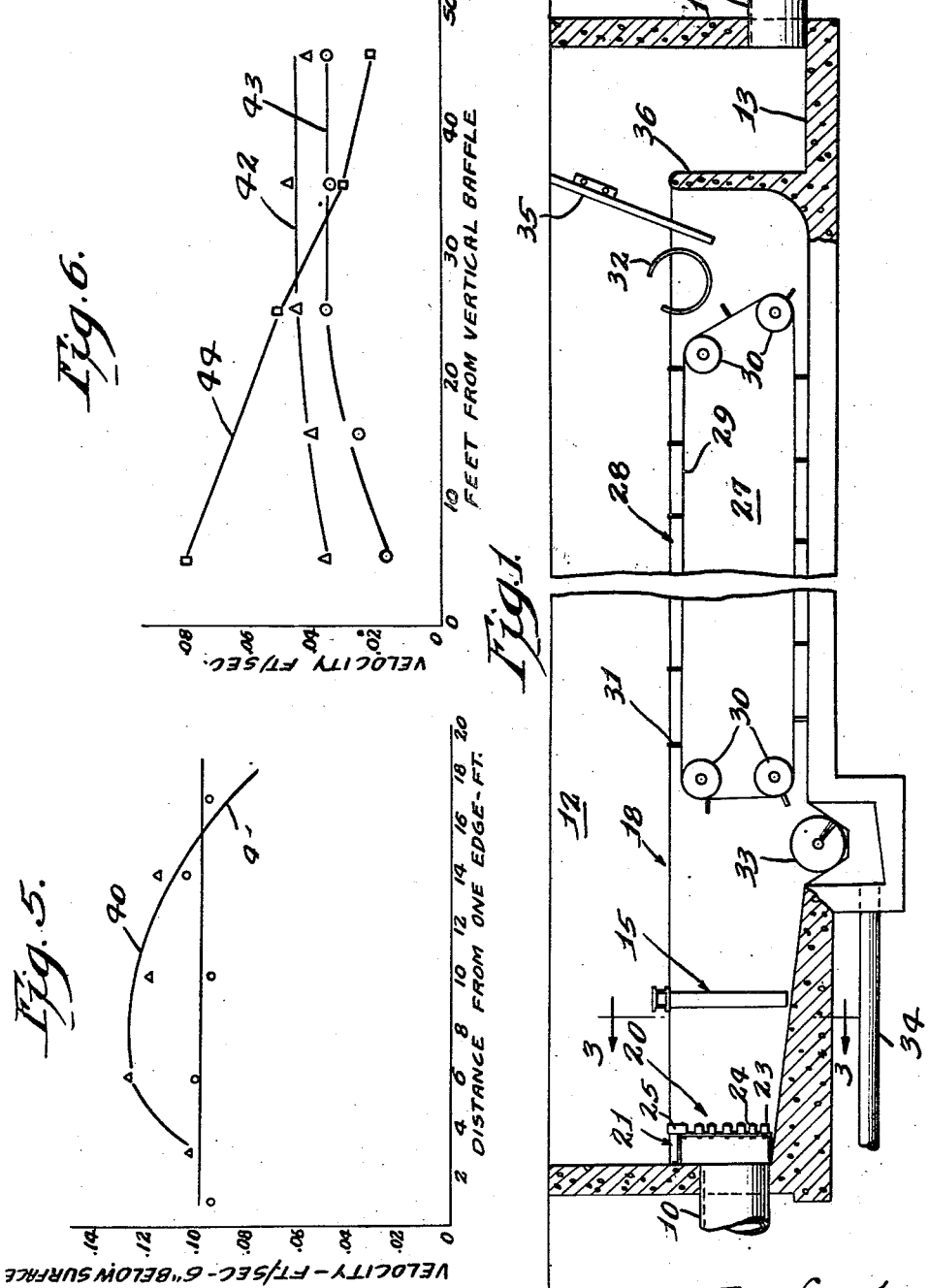
Inventor:
Leonard V. Sorg.
By Everett A. Johnson
Attorney Jan. 21, 1958     L. V. SORG     2,820,550
GRAVITY-TYPE WASTE WATER-OIL SEPARATORS
Filed June 29, 1955     2 Sheets-Sheet 2
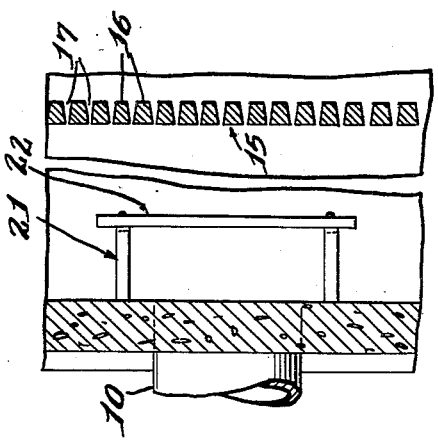
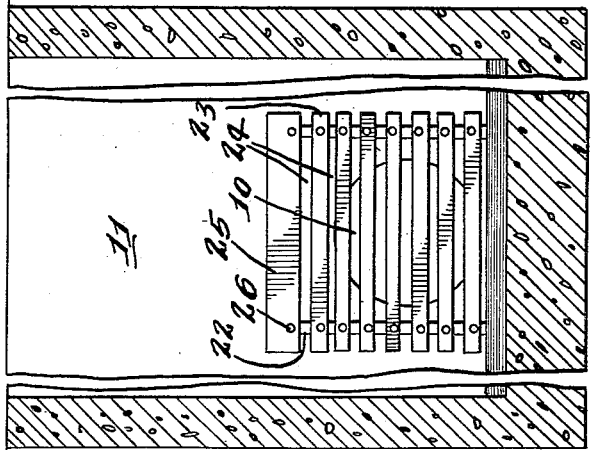
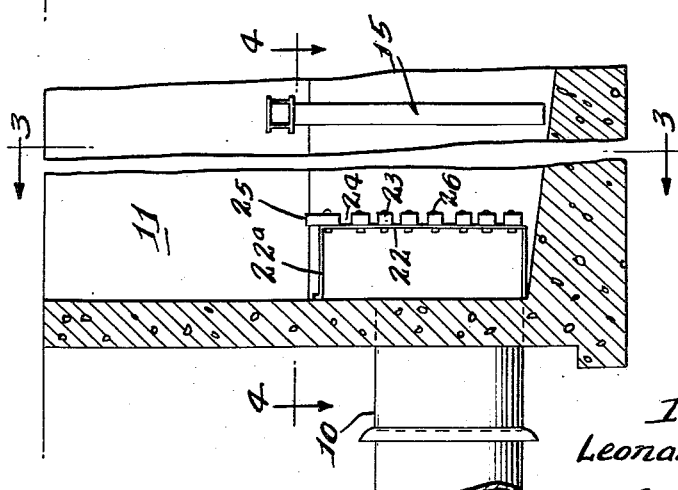
Inventor.
Leonard V. Sorg.
By. Everett A. Johnson
Attorney.

United States Patent Office 2,820,550
Patented Jan. 21, 1958

2,820,550

GRAVITY-TYPE WASTE WATER-OIL SEPARATORS

Leonard V. Sorg, Kansas City, Mo., assignor to Standard Oil Company, Chicago, Ill., a corporation of Indiana Application June 29, 1955, Serial No. 518,756

7 Claims. (Cl. 210—519)

This invention relates to improvements in the construction and operation of water-oil separators.

The separators to which this invention relates are used to remove oil from refinery waste waters before discharging the waste to surface waters outside the refinery location. The design and size of the separator depend upon the character and quantity of the oily waste water to be treated. However, we have found that conventional water-oil separators have not been entirely satisfactory and that maldistribution of flow in the separating chamber has led to carry-over and large amounts of oil have been discharged with the waste water.

To produce the desired oil-water separation, it is necessary to maintain uniform velocity gradient throughout the body of the liquid and the optimum flow pattern is to have the liquid advance in a uniform front. However, with conventional designs, maximum velocity occurs at about the center of the flow thereby creating eddy currents which prevent the proper separation of the oil from the water.

For optimum oil-water separation, a velocity as low as possible should be obtained and it is particularly important to have a uniform velocity in the layer close to the surface. Here the separated oil accumulates and must not be recombined with the water, and such recombination will result if there is poor distribution of flow through the body of liquid and across the surface of the liquid.

Another difficulty which has influenced the separation efficiency of oil-water separators heretofore used is the fact that large quantities of silt, mud and sludge build up in the inlet end ahead of the conventional vertical slot baffle so that imperfect distribution of the water through the baffle occurs. The amount of material accumulated may be such as to plug the lower portion of the baffle and hence the velocity through the baffle is greatest in the upper portion thereof. This does not permit the oil and water to separate in the subsequent chamber and the performance of the separator box is relatively poor.

It is, therefore, a primary object of this invention to provide an apparatus imparting improved flow characteristics to the fluid body in passing through the separator. An additional object of the invention is to provide a system capable of maximum oil recoveries while having large capacity for flow of waste water. A further object of the invention is to provide an apparatus which provides a uniform flow of the fluid across the surface thereby to retain maximum separation of oil and water. Still another object of the invention is to provide an apparatus which substantially eliminates the accumulation of silt solids and sludge in the forebay. These and other objects of the invention will become apparent as the details of the design and operation of the invention are given.

The oil-water separator of the type to which the improvement is directed includes an inlet sewer or tile which discharges into an elongated separator chamber or box equipped with flight cleaners which are arranged to skim the surface of the separating liquids while moving in one direction at about the rate of liquid flow through the separator and to scrape the sediment along the bottom toward an accumulator and conveyor in the other direction. The separator includes an inlet distribution chamber or forebay which is partitioned by a transverse distribution baffle. The function of the forebay is to introduce the flow into the inlet end of the separation channel in a well distributed manner and at a velocity which will not interfere with the proper functioning of the distribution baffle. However, the conventional forebay construction has been inadequate for its purposes and it is with respect to this section of the separator that my invention is particularly directed.

Briefly, I attain the objects of my invention by providing a horizontal slot baffle within the forebay and spaced from the inlet. This baffle, when used in conjunction with the vertical slot baffle, has been found to produce a uniform velocity gradient across the surface of and through the body of the liquid stream undergoing separation.

The improved baffle is placed downstream about one-half the diameter of the inlet tile and typically comprises a plurality of spaced bars or slats providing horizontal two-inch slots having a depth of about two inches. An upper cross member of the baffle rises above the normal operating level of the liquid thereby assuring that the oil-water mixture will always flow through the uniform horizontal slots in the baffle.

The invention will be further described with reference to one embodiment thereof illustrated by the accompanying drawings wherein:

Figure 1 is a schematic elevation illustrating an oil-water separator system employing my horizontal slot baffle;

Figure 2 is an enlarged fragmentary elevation showing the details of the baffle construction;

Figure 3 is a view taken along the line 3—3 in Figures 1 and 2;

Figure 4 is a top view taken along the line 4—4 in Figure 2;

Figure 5 shows the velocity distribution patterns across the separator box with and without my baffle; and Figure 6 is a graph showing the beneficial effect of the use of the horizontal slotted baffle on the overall flow velocity and hence the separation efficiency of the apparatus.

Referring to Figure 1, the oily waste water to be treated is introduced by inlet tile 10 into the forebay 11 of the separating channel 12. The separated waste water is withdrawn from the effluent flume 13 by effluent sewer 14.

The forebay 11 is separated from the separator channel 12 by the vertical slot baffle 15. This baffle 15 comprises a plurality of vertical members 16 which are set flush with the floor of the chamber or channel 12 and should extend above the operating water level 18 but with provisions for overflowing to prevent flooding of the forebay 11 in the event of an upset. The members 16 are preferably of tapered cross section as shown in Figure 4 to provide a slight expansion or flaring of the slots 17 in a downstream direction. The unobstructed or flow area of the baffle 15 is minor compared to the total cross-sectional area of the chamber 12 and the actual percentage may be greater or less depending upon how many members 16 and slots 17 are fitted across the chamber 12. For example, a chamber 20 feet wide will accommodate about 30 slots and it is considered impractical to have a slot width of less than about one-eighth inch. Also, as a general rule, the spacing of the slots 17 should be as close together as possible in order to approximate the ideal diffusion wall.

The horizontal slot baffle 20 is illustrated in some detail by Figures 2, 3 and 4. This baffle 20 is disposed downstream of inlet tile 10, for example a distance corresponding approximately to one-half the diameter of tile 10. Thus, with a 36-inch tile, I have found a distance of 18 inches to be very satisfactory.

Referring to Figures 1 and 2, the horizontal slot baffle 20 is supported on a frame 21, the illustrated frame 21 comprising a pair of metal straps 22 having lateral arms 22a which are bolted at their ends by suitable lugs to the wall of the forebay 11, one on either side of the influent tile 10. The transverse bars or slats 23 of the baffle 20 are suitably constructed of wooden 2 x 4's vertically spaced on the frame 21 to provide horizontal flow slots 24 about two inches in width between each slat 23. The bottom-most slat 23 is positioned so that it is just about even with the base of the influent tile 10, i. e. somewhat above the floor of the forebay 11 which is sloped downwardly away from the inlet tile 10.

The top-most slat 25 is substantially wider than slats 23 and may comprise, for example, a 2 x 10 and is positioned on the frame 21 so that the upper surface of it is above the normal operating water level 18 by one or two inches.

The baffle 20 is approximately square and has a lateral dimension of not less than the diameter of the inlet tile 10 and not more than about twice the inlet tile diameter. Thus, with an inlet tile 10 about 36 inches in diameter, the horizontal baffle 20 has a width of about five feet so that the outer edges of the baffle 20 extend beyond the influent tile 10 a distance of about one foot at the maximum diameter as shown in Figure 3. In this connection, it should be noted with respect to Figure 3 that this view has been compressed and that the horizontal slot baffle 20 occupies only about five feet of the total width of about 20 feet of the separator channel 12.

Each of the slats 23 is shown as fixed by bolts 26 or the like to the narrow frame members 22, but it will be apparent that other means for mounting the slats 23 can be provided so long as the flow pattern of the baffle is not adversely affected. Likewise, other than 2 x 4's may be used to provide the bars 23. It is preferred, however, that the slots 24 formed by the bars 23 should have a downstream dimension of between about one and three inches thereby to direct the flow in a substantially laminar, non-turbulent manner through the horizontal baffle 20 through the forebay 11.

After passing through the horizontal slot baffle 20 and the vertical slot baffle 15, the fluid with substantially all of its separable liquids and solids passes from the forebay 11 into the separator section 27 of the separator box or channel 12. Within the separator section 27 there is provided a flight cleaner 28 comprising endless chain means 29 passing about sprockets 30. Means (not shown) are provided for driving the sprockets 30 whereby the flights 31 travel in contact with the floor of the separator section 27 and delivers the separated sediment or sludge into the sludge conveyor 33 which may be of the screw type. The recovered sludge is withdrawn from the conveyor means 33 by sludge discharge pipe 34 for disposal as, for example, by the so-called double pond system. Since many such flight cleaners 28 and conveyors 33 are well known, details thereof are not shown in the drawings.

Construction details of the rotatable oil-skimming pipe 32 are not shown in schematic Figure 1, but it is located at the water level 18 ahead of the oil retainer baffle 35. Ordinarily, the skimming pipe 32 is about ten inches in diameter and the oil collected thereby is discharged into a suitable sump tank (not shown) for collection and recovery. Such collecting tank is preferably installed below the separator operating level 18 so that the oil skimmed by the pipe 32 can flow by gravity to the collecting tank.

The waste liquid beyond the baffle 35 flows over the wier or wall 36 into the effluent flume 13, out through the effluent sewer 14, and ultimately into surface waters such as a river. The wier 36 controls the operating depth of the water in the separator box 12 and extends upward from the floor of the chamber 27 to a height equal to the desired water depth less the depth of normal flow over the crest. Experience has indicated that a depth of at least three feet is necessary to avoid turbulence at the surface and a preferred depth is about 5.5 feet. The total depth of the box 12 in such a system is about 11 feet.

Referring to Figure 5, I have presented data from which it will be seen that with no baffle 15 across the influent tile 10 a distorted flow pattern 40 is obtained, the maximum velocity occuring at about the center of the flow which creates eddy currents and prevents the proper separation of the oil from the water. This performance may be compared to that when the horizontal slot baffle 20 is used. The flow pattern then becomes a uniform velocity front indicated by the horizontal line 41 in Figure 5.

In addition to achieving uniform flow across the body of the liquid, the use of the horizontal slot baffle 20 with vertical slot baffle 15 provides uniform flow throughout the length of liquid travel in the chamber 12, as shown by curves 42 and 43 in Figure 6. Measurements were made 2.5 feet on either side of the center and curves 42 and 43 show that the velocity throughout the entire time of travel through the separator 12 is substantially within the range of 0.02 to 0.04 foot per second. On the other hand, curve 44 in Figure 6 indicates the poor flow distribution along the length of the chamber 12 when the baffle 20 is omitted.

For optimum oil-water separation, a velocity as low as possible should be maintained and a rate of flow in the range of 0.02 to 0.04 foot per second is satisfactory. From curve 44 it is clear that the optimum separation of oil and water did not occur until at least 75% of the travel through the separation box or chamber 12 is passed. By my improvement, the full advantage can be taken of the optimum range substantially throughout the separator.

It will be apparent from the data represented by Figures 5 and 6 that the placement of the horizontal flow baffle 20 across the influent tile 10 within the forebay 11 produced the desirable uniformity of flow both across the travelling front and throughout the entire residence time within the separator 12. This has markedly reduced the amount of oil lost in the effluent water and has resulted in large savings due to the recovery of oil and has resulted in greatly decreased pollution of surface waters.

Prior to the use of the horizontally slotted baffle 20, silt accumulated in the forebay 11, the accumulations reaching such proportions at times as to block off significant sections of the vertical slot baffle 15 which disturbed the flow and prevented proper separation of the oil and water. Ridges of silt accumulated to a depth of 36 inches or more toward the outside edges of the forebay 11 and corresponding portions of the vertical slot baffle 15 were made useless by such accumulation of silt. This resulted in high central velocity as described above. On the other hand, when the horizontal baffle 20, according to the invention, is used there is substantially no accumulation of silt and by actual measurement did not exceed a depth of about 4 inches in the forebay 11. In addition to avoiding silt accumulation, the horizontal slot baffle 20 develops a uniform frontal flow by the time flow reaches the vertical slot baffle 15. Consequently, the entire area of the vertical slot baffle 15 remains available for its designed function.

Oil recoveries from the separator have been significantly improved by the installation of the horizontal slot baffle 20. For example, in one separator following the installation of the horizontal slot baffle 20, the oil recovery increased nearly 50% over that previously obtained, and the pollution of surface waters was reduced by 50%.

From the above it will be apparent that the objects of the invention are attained and an improvement in oil-water separators is provided which has resulted in greatly increased efficiency of separation which has two-fold benefits. Pollution of surface waters is minimized and the additional recovered oil has a value which is many times in excess of the added cost of installation and maintenance.

Although the invention has been described with reference to particular embodiments thereof which have been set out in some detail, it should be understood that this is by way of illustration only. Accordingly, modifications in the apparatus and the mode of using such apparatus by those skilled in the art are contemplated without departing from the scope of the invention described herein.

What is claimed is:

1. In an oil-water separator including an elongated separator box, an inlet tile discharging into said box, and a vertically slotted baffle extending across the entire width of the box providing a forebay into which said tile discharges, the improvement which comprises a horizontal slot baffle disposed across said inlet tile and in said forebay, said horizontal slot baffle consisting essentially of a plurality of vertically spaced bars, the height of the slots being about one-half the height of the bars, said baffle extending upwardly from the level of the bottom of the inlet tile.

2. The horizontal slot baffle of claim 1 which comprises a frame means extending from the end wall of said separator box adjacent the said inlet tile disposing said baffle downstream of said inlet tile about 18 inches, and wherein said bars comprise a plurality of 2 x 4's mounted on 6 inch centers on said frame means, and a head bar on said baffle above said bars comprising a 2 x 10 extending above and below the normal operating liquid level.

3. The separator of claim 1 wherein the horizontal slot baffle comprises in combination frame means, a plurality of horizontally disposed bars supported by said frame means, said bars having a height of about 4 inches each and arranged on 6 inch centers thereby producing a plurality of horizontal slots each having a height of about 2 inches, said bars being of substantial thickness and presenting a plurality of substantially horizontal surfaces downstream for a distance approximating the width of said slots, said bars having a length which is greater than the diameter of said outlet tile and less than about two diameters of said tile.

4. In a separator for the separation of oil-water mixtures, inlet tile means for supplying such mixture to a separation box, a horizontal slot baffle in said box downstream from said inlet tile and transverse to the flow from said tile, a vertical slot baffle means downstream of said horizontal slot baffle and extending across the entire flow area of said separation box, said horizontal slot baffle being disposed downstream of the discharge end of the inlet tile a distance equivalent to about one-half the diameter of said tile.

5. The apparatus of claim 4 wherein said horizontal slot baffle extends upwardly from about the level of the bottom of said inlet tile and transversely of said tile a distance greater than the diameter of said inlet tile but less than about twice the diameter of the tile.

6. An oil separating apparatus comprising an elongated chamber of substantial width, an inlet tile discharging into said chamber at one end thereof and of small diameter relative to the width of said chamber, an outlet sewer remote from said inlet tile, a vertically slotted baffle across the entire width of said chamber and disposed downstream of said inlet tile, said vertical slot baffle defining a forebay within said chamber, an oil-skimming means adjacent the discharge end of said chamber and downstream of said vertical slot baffle, sludge recovery means intermediate said baffle and said oil-skimming means, an overflow wier across the width of said chamber downstream of said oil-skimming means and providing a discharge flume at the end of said chamber remote from said inlet tile, means for withdrawing sludge from said chamber, and a horizontal slot baffle means in said forebay intermediate said inlet tile and said vertical slot baffle.

7. The apparatus of claim 6 wherein the horizontal slot baffle means comprises a plurality of horizontal narrow bars having a substantial thickness downstream, the height of the slots being substantially equal to the said downstream thickness of said bars whereby horizontal channels are provided, and a frame means supporting said bars in vertically spaced relation, said frame means supporting said baffle means downstream of said inlet tile a distance approximately equivalent to the diameter of said tile.

References Cited in the file of this patent

UNITED STATES PATENTS

| | | |
|---|---|---|
| 317,366 | Jaeger | May 5, 1885 |
| 514,438 | Blessing | Feb. 13, 1894 |
| 917,918 | Wixford | Apr. 13, 1909 |
| 1,302,839 | Olson | May 6, 1919 |
| 2,254,176 | Fischer | Aug. 26, 1941 |
| 2,327,703 | Freden | Aug. 24, 1943 |

FOREIGN PATENTS

| | | |
|---|---|---|
| 242,594 | Switzerland | Oct. 16, 1946 |